(12) United States Patent
Wang et al.

(10) Patent No.: US 12,025,537 B1
(45) Date of Patent: Jul. 2, 2024

(54) INDOOR TEST DEVICE FOR SIMULATING A VIBRATION PILE SINKING PROCESS AND TESTING A BEARING CAPACITY THEREOF AND TEST METHOD THEREOF

(71) Applicant: East China Architecture Design and Research Institute Co., Ltd., Shanghai (CN)

(72) Inventors: Weidong Wang, Shanghai (CN); Jiangbin Wu, Shanghai (CN); Jiabin Wei, Shanghai (CN); Yonghong Wang, Qingdao (CN); Zhidao Zhou, Shanghai (CN)

(73) Assignee: East China Architecture Design and Research Institute Co., Ltd., Shanghai (CN)

( * ) Notice: Subject to any disclaimer, the term of this patent is extended or adjusted under 35 U.S.C. 154(b) by 0 days.

(21) Appl. No.: 18/400,735

(22) Filed: Dec. 29, 2023

(30) Foreign Application Priority Data

Dec. 11, 2023 (CN) .......................... 202311695502.6

(51) Int. Cl.
*G01M 7/02* (2006.01)
(52) U.S. Cl.
CPC ..................... *G01M 7/02* (2013.01)

(58) Field of Classification Search
CPC .......... G01M 7/02; G01M 7/00; G01M 7/022; G01M 7/025; G01M 7/027; G01M 7/04; G01M 7/06; G01M 7/08
See application file for complete search history.

(56) References Cited

U.S. PATENT DOCUMENTS

| | | | | |
|---|---|---|---|---|
| 9,506,905 B2* | 11/2016 | Ley | .................. | G01N 33/383 |
| 11,248,987 B2* | 2/2022 | Han | .................. | G01M 7/022 |
| 11,906,480 B2* | 2/2024 | Manning | .................. | G01N 3/10 |
| 2020/0003751 A1* | 1/2020 | Li | .................. | G01N 33/383 |

FOREIGN PATENT DOCUMENTS

| | | |
|---|---|---|
| CN | 104141322 A | 11/2014 |
| CN | 112267497 A | 1/2021 |

\* cited by examiner

*Primary Examiner* — Suman K Nath

(57) ABSTRACT

Provided is an indoor test device for simulating a vibration pile sinking process and testing a bearing capacity thereof and a test method thereof. The indoor test device comprises a container, a soil located in the container, a vibration penetration system and a balanced vibration damping system, the vibration penetration system is vertically arranged above the soil in the container, and the balanced vibration damping system is located right above the vibration penetration system and coaxially arranged with the vibration penetration system. The indoor test device and the test method apply to researching on the vibration pile sinking process and testing the bearing capacity thereof in different types of soil, and adapts to different frequencies and different exciting forces.

10 Claims, 4 Drawing Sheets

INDOOR TEST DEVICE FOR SIMULATING A VIBRATION PILE SINKING PROCESS AND TESTING A BEARING CAPACITY THEREOF AND TEST METHOD THEREOF

CROSS REFERENCE TO RELATED APPLICATIONS

This application claims foreign priority of Chinese Patent Application No. 202311695502.6, filed on Dec. 11, 2023 in the China National Intellectual Property Administration, the disclosures of all of which are hereby incorporated by reference.

TECHNICAL FIELD

The present invention relates to the technical field of pile foundation engineering. More particularly, the present invention relates to an indoor test device for simulating a vibration pile sinking process and testing a bearing capacity thereof and a test method thereof.

BACKGROUND OF THE PRESENT INVENTION

In the pile foundation engineering, a vibration pile sinking has outstanding advantages such as fast construction speed and strong stratum applicability, and has thus been widely used in construction processes of steel sheet piles and steel pipe piles. With the continuous development of vibration pile sinking technology, a novel vibration pile sinking technology called high-frequency resonance-free method has been gradually applied in cities in recent years, and the novel vibration pile sinking technology can effectively reduce environmental impacts such as noise pollution, soil vibration and soil squeezing effect. However, the current research on the vibration pile sinking is still not thorough, which lags behind the engineering practice in terms of the penetration mechanism, the environmental impact and bearing characteristics. In view of the complexity of the site conditions for in-situ test and the need to a significant amount of manpower, financial and material resources, the use of an indoor model test to carry out vibration pile sinking research is an economically feasible means. Several patent documents related to indoor simulated vibration pile sinking has found by retrieval. Wherein a Chinese patent publication No. CN104141322A provides an indoor vibration pile sinking test device, which can be applied to simulate the sinking of a vertical straight pile or an inclined pile. However, the test device in this patent is bulky, and is not suitable for an indoor small-scale model test. Meanwhile a high-frequency cyclic friction effect exists between the test pile and a gripper surrounding the test pile in the vibration pile sinking process, which is different from the actual vibration pile sinking process. In addition, a test for the pile bearing capacity after the vibration pile sinking is not involved.

The Chinese patent publication No. CN112267497A provides a vibration pile sinking simulation test system, comprising a vibration-loading device, a pile sinking simulation device and a signal acquisition device. However, the soil in this patent moves relative to the pile, which is different from the process of pile penetration into the soil during an actual vibration pile sinking. And a test for the pile bearing capacity after the vibration pile sinking is also not involved.

Therefore, to facilitate a more extensive research on the vibration pile sinking with an indoor test, there is an urgent need for an indoor test device that is small in size, easy to manufacture, and capable of more realistically simulating the penetration of the pile into the soil during the vibration pile sinking and testing the bearing capacity thereof.

Summary of Present Invention

It is an object of the present invention to provide an indoor test device for simulating a vibration pile sinking process and testing a bearing capacity thereof, and test method thereof.

The indoor test device for simulating the vibration pile sinking process and testing the bearing capacity thereof is provided, comprising a container, and a soil located in the container, wherein the indoor test device further comprises a vibration penetration system and a balanced vibration damping system, the vibration penetration system is vertically arranged above the soil in the container, the balanced vibration damping system is located right above the vibration penetration system and coaxially arranged with the vibration penetration system, and the vibration penetration system and the balanced vibration damping system may be disassembled during the bearing capacity test of the pile.

Further, the vibration penetration system comprises a pile to be penetrated into the soil, a pile cap connected with the pile, and a vibration motor connected with the pile cap, the top of the pile penetrated into the soil is coaxially provided with the pile cap, the pile cap is coaxially and fixedly connected with the vibration motor, the balanced vibration damping system comprises a damper spring connected with the vibration motor, a flexible rope, a first fixed pulley, a second fixed pulley, a weight plate and a plurality of weights located in the weight plate, one end of the flexible rope is connected with the damper spring and then passes through the first fixed pulley and the second fixed pulley sequentially, and the other end of the flexible rope is connected with the weight plate.

Further, the indoor test device for simulating the vibration pile sinking process and testing the bearing capacity thereof further comprises a frame formed by a plurality of reaction frames in an enclosure manner, wherein the container is located inside the frame.

Further, the container is provided with a visual access hole on any side.

Further, the indoor test device for simulating the vibration pile sinking process and testing the bearing capacity thereof further comprises a movable hydraulic power supply system, wherein the movable hydraulic power supply system comprises a small cross beam, a hydraulic jack and large cross beams, the large cross beam is connected between the adjacent reaction frames, the small cross beam is connected between the adjacent large cross beams, the hydraulic jack is installed on the small cross beam, and the balanced vibration damping system is installed on the movable hydraulic power supply system.

Further, the pile and the pile cap are connected by a first fixing screw, and the pile cap and the vibration motor are fixedly connected by a second fixing screw.

Further, the indoor test device for simulating the vibration pile sinking process and testing the bearing capacity thereof further comprises a pressure sensor for testing the bearing capacity of the pile, wherein the pressure sensor is placed between the hydraulic jack and the pile after the vibration pile sinking is completed.

Further, the large cross beam is connected between the adjacent reaction frames through a guide slide bushing.

Further, the small cross beam is capable of moving to a designated position through a guide rail at one side of the large cross beam.

A test method for simulating a vibration pile sinking process and testing a bearing capacity thereof based on the above test device is provided, including the following steps:

step 1: obtaining a target soil sample;
step 2: laying above target soil sample in a container in layers according to an established requirement;
step 3: arranging a vibration penetration system on the container;
step 4: setting up a balanced vibration damping system, passing one end of a flexible rope through a first fixed pulley and a second fixed pulley first, then connecting one end of the flexible rope close to the first fixed pulley with a vibration damper spring, and connecting the other end of the flexible rope with a weight plate;
step 5: determining a penetration position of the pile;
step 6: initiating the vibration penetration system;
step 7: after a model pile reaches a target depth, dismantling the balanced vibration damping system and the vibration penetration system;
step 8: pulling out the pile; and
step 9: replacing the test soil sample, wherein in the step 7, when a rest period of the model pile satisfies a target number of days, a pressure sensor is placed and compressed between a hydraulic jack and the pile, then a bearing capacity test of the model pile is carried out, a load is gradually applied to the pile by the hydraulic jack, and then a displacement of the pile is obtained from a moving distance of a jacking member displayed by the hydraulic jack in real time, so as to obtain a load versus displacement curve graph; and in the step 8, the pulling out the pile is completed by vibration in conjunction with an increase of a weight in a weight plate.

The present invention provides an indoor test device for simulating the vibration pile sinking process and testing the bearing capacity thereof, which is simple in overall structure, economical, practical and easy to manufacture, and is capable of simulating the vibration pile sinking process and testing the bearing capacity thereof. The present invention applies to researching on the vibration pile sinking process and testing the bearing capacity thereof in different types of soil bodies, and the type of the pile used is also not limited, and meanwhile the vibration motor currently available in the market can be selected to provide different frequencies and different exciting forces.

DETAILED DESCRIPTION OF PREFERRED EMBODIMENTS

Figure 1:
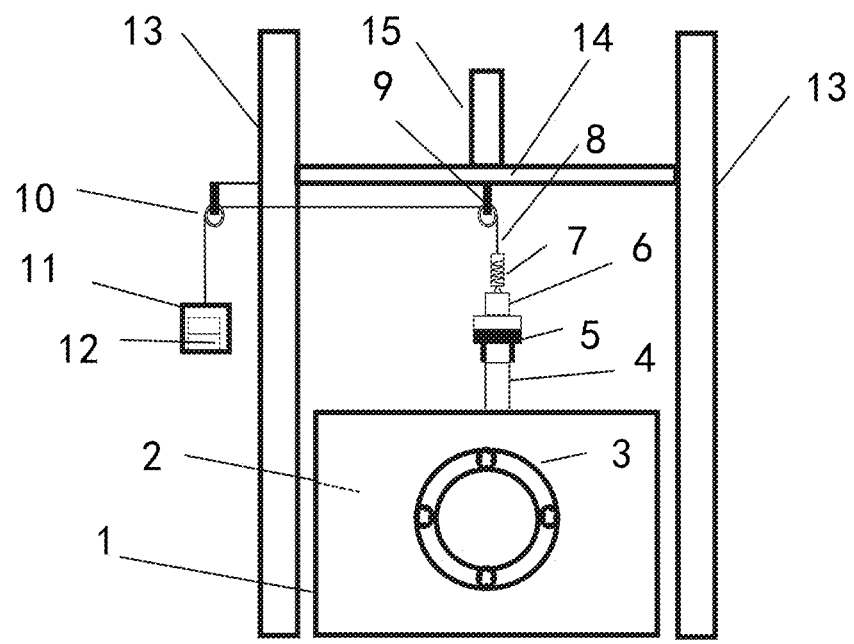
FIG. 1 is a schematic structural diagram of an indoor test device of the present invention during vibration pile sinking.
Figure 2:
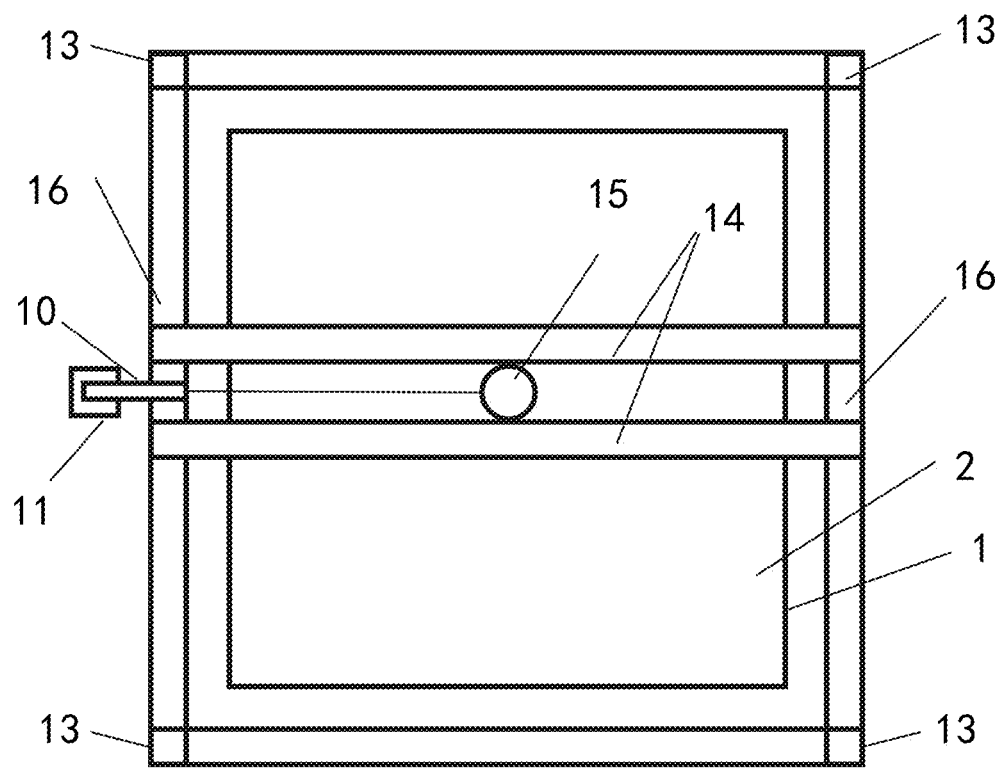
FIG. 2 is a top view of a structure of an indoor test device of the present invention during vibration pile sinking.

In order to make the purpose, technical solution and advantages of the present invention more clear, the invention will be further described in detail hereinafter with reference to the attached drawings and embodiments. It should be understood that the particular embodiments described here are only for the purpose of explaining the invention, and are not intended to limit the invention.

An indoor test device for simulating a vibration pile sinking process and testing a bearing capacity thereof is provided, as shown in FIGS. 1 to 6, which comprises a frame formed by a plurality of reaction frames 13 in an enclosure manner, large cross beams 16 connected between the adjacent reaction frames 13, a small cross beam 14 connected between the adjacent large cross beams, a hydraulic jack 15 installed on the small cross beam 14, a container 1 located inside the frame, a soil 2 located in the container 1, a visual access hole 3 located at one side of the container 1, a pile 4 to be penetrated into the soil 2, a pile cap 5 installed at the top of the pile 4, a vibration motor 6 fixedly connected with the pile cap 5, a damper spring 7 connected with the vibration motor 6, a first fixed pulley 9, a second fixed pulley 10, a flexible rope 8, a weight plate 11, a plurality of weights 12 located in the weight plate 11, and a pressure sensor 22 for testing the bearing capacity of the pile 4.

Wherein, the pile 4 in the soil 2, the pile cap 5 installed at the top of the pile 4 and the vibration motor 6 fixedly connected with the pile cap 5 form a vibration penetration system; the damper spring 7, the first fixed pulley 9, the second fixed pulley 10, the flexible rope 8, the weight plate 11 and the plurality of weights 12 located in the weight plate 11 form a balanced vibration damping system; and the small cross beam 14, the hydraulic jack 15 and the large cross beam 16 form a movable hydraulic power supply system. The balanced vibration damping system is located right above and coaxially arranged with the vibration penetration system, and the vibration penetration system and the balanced vibration damping system may be disassembled during the bearing capacity test of the pile.

Wherein, the large cross beam 16 is connected between the adjacent reaction frames 13 through a guide slide bushing; the large cross beam 16 may climb or descend to a suitable height on the vertical reaction frame 13; and the small cross beam 14 may move to a designated position through a guide rail on one side of the large cross beam 16.

A change in soil particle displacement of a soil sample in the container is observed and recorded through the visual access hole 3 during the test, and the soil sample may be replaced by opening the visual access hole 3 after a single soil sample test is completed.

Figure 3:
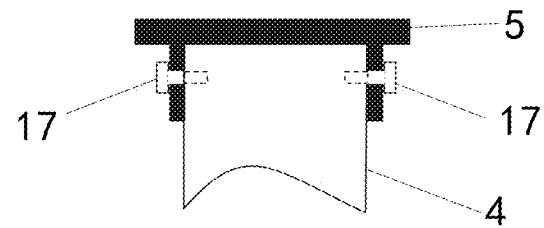
FIG. 3 is a schematic diagram of a fixed connection between a pile and a pile cap of an indoor test device of the present invention.
Figure 4:
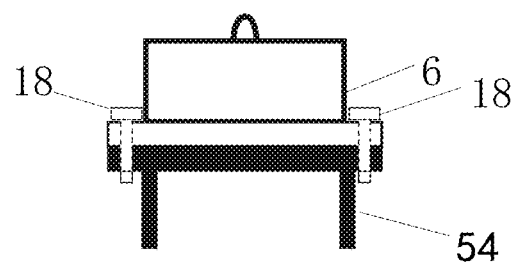
FIG. 4 is a schematic diagram of a fixed connection between a pile cap and a vibration motor of an indoor test device of the present invention.
Figure 5:
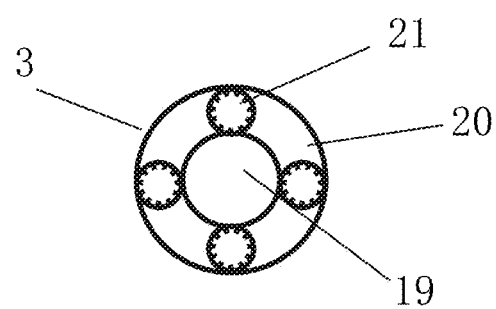
FIG. 5 is a schematic diagram of a visual access hole in an indoor test device of the present invention.

As shown in FIGS. 3 and 4, the pile 4 and the pile cap 5 are connected by a first fixing screw 17; and the pile cap 5 and the vibration motor 6 are fixedly connected by a second fixing screw 18. As shown in FIG. 5, a tempered glass 19 and a fixing steel ring 20 in the visual access hole 3 are connected with the container 1 through nuts 21. When testing the pile for bearing capacity, the pressure sensor 22 is placed between the hydraulic jack 15 and the pile 4, and the hydraulic jack 15 may display a moving distance of a jacking member in real time.

The vibration motor 6 provides different frequencies and different exciting forces for the pile 4 to penetrate into the soil 2; one end of the flexible rope 8 is connected with the damper spring 7 and then passes through the first fixed pulley 9 and the second fixed pulley 10 sequentially, and the other end of the flexible rope 8 is connected with the weight plate 11; and a static load acting on the pile 4 is changed by increasing the number of weights 12.

Figure 6:
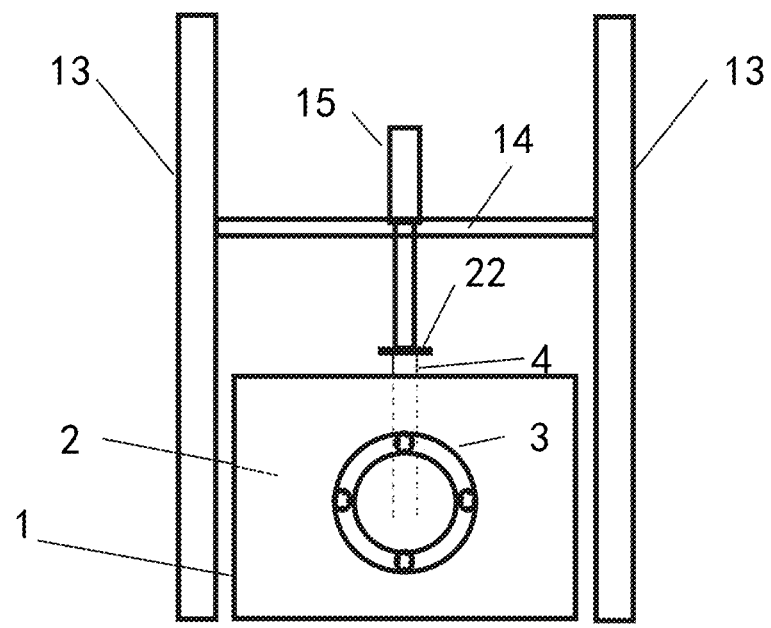
FIG. 6 is a schematic diagram of an overall structure of an indoor test device of the present invention during bearing capacity test of a model pile.

As shown in FIG. 6, the pressure sensor 22 is placed between the hydraulic jack 15 and the pile 4 after the vibration pile sinking is completed, and then different loads are gradually applied to the top of the pile and the displacement of the pile top is recorded.

The vibration motor 6 has two functions of adjustable frequency and adjustable eccentric moment, and is capable of providing different frequencies and different exciting forces. The vibration motor 6 in this embodiment uses a variable-frequency vibration motor with a frequency adjustment range of the exciting force from 20 Hz to 50 Hz, and a maximum exciting force of 10 kN.

The weight 12 in this embodiment is a fifth of the total weight of the pile 4, the pile cap 5 and the vibration motor 6, and the number of the weight 12 is five.

As shown in FIG. 1, the pile 4, the pile cap 5 and the vibration motor 6 form a vibration penetration system. A load F of the vibration penetration system is calculated by using the equation of $F=F_d \cos(2\pi ft)+F_0$, wherein $F_d$ is a vibration exciting force set for the vibration motor 6, f is a vibration exciting force frequency set for the vibration motor 6, t is a pile sinking time of the penetration system, and $F_0$ is a static load of the vibration penetration system, which is equal to a difference between the sum of the self-weight of the pile 4, the pile cap 5 and the vibration motor 6 and the sum of the self-weight of the weight plate 11 and the weight 12.

That is to say, an indoor test device for simulating a vibration pile sinking process and testing a bearing force thereof provided by the present invention comprises a container 1, a vibration penetration system connected with the container 1, a balanced vibration damping system connected with the vibration penetration system, and a movable hydraulic power supply system, wherein the container 1, the vibration penetration system and the balanced vibration damping system are located below the movable hydraulic power supply system, the pile 4 of the vibration penetration system is to be penetrated into the soil 2 in the container 1, and the damper spring 7 of the balanced vibration damping system is connected with the vibration motor 6 of the vibration penetration system.

This embodiment is an indoor test for simulating the vibration pile sinking process and testing the bearing capacity thereof, which is carried out by using the above indoor test device, and with a test method including the following steps.

At step 1, a target soil sample is obtained, which may be an undisturbed soil taken at a construction site or a remoulded soil to be self-prepared.

At step 2, the above target soil sample is laid in a container 1 in layers according to an established requirement, and the container 1 is capable of satisfying different requirements for preparing different target soil samples.

At step 3, a vibration penetration system is arranged on the container 1. The pile 4 is in close contact with the pile cap 5, and meanwhile the pile 4 and the pile cap 5 are fixedly connected by the first fixing screw 17. Since the diameter of the pile 4 are variable, the first fixing screw 17 may be fixed with the pile according to a number of tightening turns determined based on the change in the diameter of the pile 4.

At step 4, a balanced vibration damping system is set up. One end of the flexible rope 8 passes through the first fixed pulley 9 and the second fixed pulley 10 first, then one end of the flexible rope 8 close to the first fixed pulley 9 is connected with a built-in vibration damper spring 7, and the other end of the flexible rope is connected with a weight plate 11.

At step 5, a penetration position of the pile 4 is determined by moving the small cross beam 14 and the hydraulic jack 15 to a predetermined pile position, confirming and rechecking with a tape measure and a coordinate, and marking the pile position with a lime powder.

Figure 7:
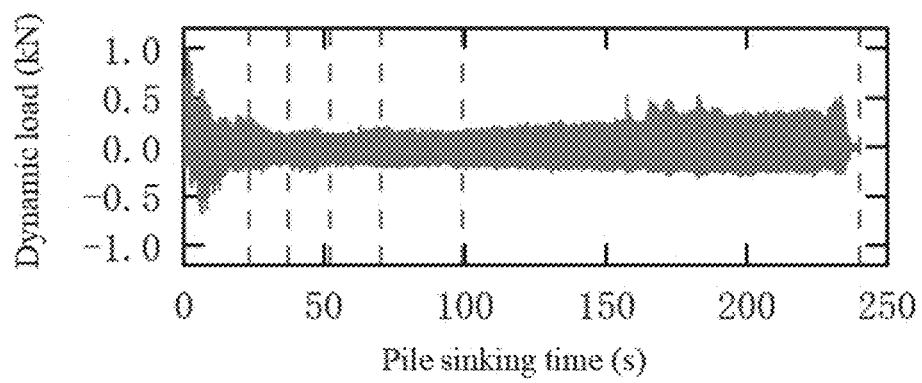
FIG. 7 is a dynamic load versus time travel curve graph on top of a pile in an indoor test device of the present invention during vibration pile sinking.

At step 6, the vibration penetration system is initiated. A video device may be arranged at the visual access hole 3 to observe the change in soil particle displacement during vibration pile sinking, so as to further strengthen the understanding of the penetration mechanism of vibration pile sinking. Additionally, a load sensor may be arranged on the pile 4 to obtain the dynamic load versus travel time curve graph on top of the pile during vibration pile sinking through a data acquisition instrument, as shown in FIG. 7.

At step 7, after a model pile reaches a target depth, the balanced vibration damping system and the vibration penetration system are dismantled.

Figure 8:
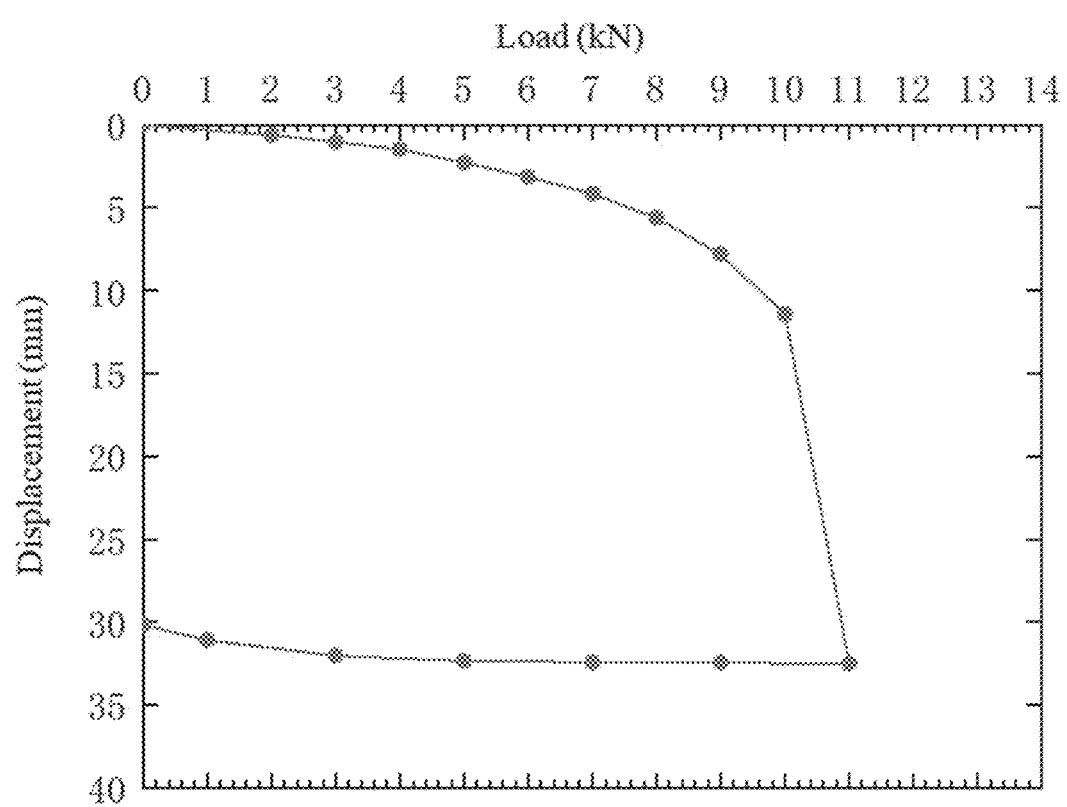
FIG. 8 is a load versus displacement curve graph of a model pile of an indoor test device of the present invention during bearing capacity test.

When a rest period of the model pile satisfies a target number of days, the large cross beam 16 may descend to a suitable height on the vertical reaction frame 13, and a pressure sensor 22 is placed and compressed between a hydraulic jack 15 and the pile 4. Subsequently, the bearing capacity test of the model pile is carried out, a load is gradually applied to the pile 4 by the hydraulic jack 15, and a displacement of the pile 4 is obtained from a moving distance of a jacking member displayed by the hydraulic jack 15 in real time, so as to obtain a load versus displacement curve graph of the pile 4, as shown in FIG. 8.

At step 8, the pile is pulled out. In the present embodiment, the pulling out of the pile may be carried out by vibration in conjunction with an increase of a weight 12 in a weight plate 11.

At step 9, the test soil sample is replaced. For different requirements of specific tests, in order to meet the replacement requirements for the test soil sample more quickly, a visual access hole 3 is designed at one side around the container 1 in this embodiment, which may be opened by removing the nut 21 to take and reload the soil sample during the test.

The present invention provides an indoor test device for simulating the vibration pile sinking process and testing the bearing capacity thereof, which is simple in overall structure, economical, practical and easy to manufacture, and is capable of simulating the vibration pile sinking process and testing the bearing capacity thereof. The present invention applies to researching on the vibration pile sinking process and testing the bearing capacity thereof in different types of soil, and the type of the pile used is also not limited, and meanwhile the vibration motor currently available in the market can be selected to provide different frequencies and different exciting forces.

The above description is merely the preferred embodiment of the present invention, and is not intended to limit thereof in any form. Although the preferred embodiment of the present invention has been disclosed above, it is not used to limit the present invention. The above embodiment may be changed or modified slightly to an equivalent embodiment with an equivalent change by those skilled in the art by using the technical contents disclosed above without departing from the scope of the technical solution of the present invention. However, any simple modifications, and equivalent changes and modifications made to the above embodiments according to the technical essence of the present invention without departing from the content of the technical solution of the present invention still belong to the scope of the technical solution of the present invention.

We claim:

1. An indoor test device for simulating a vibration pile sinking process and testing a bearing capacity thereof, comprising a container, and a soil located in the container, wherein the indoor test device further comprises a vibration penetration system and a balanced vibration damping system, the vibration penetration system is vertically arranged above the soil in the container, and the balanced vibration damping system is located right above the vibration penetration system and coaxially arranged with the vibration penetration system.

2. The indoor test device for simulating the vibration pile sinking process and testing the bearing capacity thereof according to claim 1, wherein the vibration penetration system comprises a pile to be penetrated into the soil, a pile cap connected with the pile, and a vibration motor connected with the pile cap, a top of the pile penetrated into the soil is coaxially provided with the pile cap, the pile cap is coaxially and fixedly connected with the vibration motor, the balanced vibration damping system comprises a damper spring connected with the vibration motor, a flexible rope, a first fixed pulley, a second fixed pulley, a weight plate and a plurality of weights located in the weight plate, one end of the flexible rope is connected with the damper spring and then passes through the first fixed pulley and the second fixed pulley sequentially, and the other end of the flexible rope is connected with the weight plate.

3. The indoor test device for simulating the vibration pile sinking process and testing the bearing capacity thereof according to claim 1, further comprising a frame formed by a plurality of reaction frames in an enclosure manner, wherein the container is located inside the frame.

4. The indoor test device for simulating the vibration pile sinking process and testing the bearing capacity thereof according to claim 1, wherein the container is provided with a visual access hole on any side.

5. The indoor test device for simulating the vibration pile sinking process and testing the bearing capacity thereof according to claim 2, further comprising a movable hydraulic power supply system, wherein the movable hydraulic power supply system comprises a small cross beam, a hydraulic jack and large cross beams, the large cross beam is connected between the adjacent reaction frames, the small cross beam is connected between the adjacent large cross beams, the hydraulic jack is installed on the small cross beam, and the balanced vibration damping system is installed on the movable hydraulic power supply system.

6. The indoor test device for simulating the vibration pile sinking process and testing the bearing capacity thereof according to claim 2, wherein the pile and the pile cap are connected by a first fixing screw, and the pile cap and the vibration motor are fixedly connected by a second fixing screw.

7. The indoor test device for simulating the vibration pile sinking process and testing the bearing capacity thereof according to claim 5, further comprising a pressure sensor for testing the bearing capacity of the pile, wherein the pressure sensor is placed between the hydraulic jack and the pile after the vibration pile sinking is completed.

8. The indoor test device for simulating the vibration pile sinking process and testing the bearing capacity thereof according to claim 5, wherein the large cross beam is connected between the adjacent reaction frames through a guide slide bushing.

9. The indoor test device for simulating the vibration pile sinking process and testing the bearing capacity thereof according to claim 5, wherein the small crossbeam is capable of moving to a designated position through a guide rail at one side of the large cross beam.

10. A test method for simulating a vibration pile sinking process and testing a bearing capacity thereof, wherein the following steps are completed by the indoor test device for simulating the vibration pile sinking process and testing the bearing capacity thereof according to claim 5:
step 1: obtaining a target soil sample;
step 2: laying above target soil sample in a container in layers according to an established requirement;
step 3: arranging a vibration penetration system on the container;
step 4: setting up a balanced vibration damping system, passing one end of a flexible rope through a first fixed pulley and a second fixed pulley first, then connecting one end of the flexible rope close to the first fixed pulley with a vibration damper spring, and connecting the other end of the flexible rope with a weight plate;
step 5: determining a penetration position of the pile;
step 6: initiating the vibration penetration system;
step 7: after a model pile reaches a target depth, dismantling the balanced vibration damping system and the vibration penetration system sequentially;
step 8: pulling out the pile; and
step 9: replacing the test soil sample,
wherein in the step 7, when a rest period of the model pile satisfies a target number of days, a pressure sensor is placed and compressed between a hydraulic jack and the pile, then a bearing capacity test of the model pile is carried out, a load is gradually applied to the pile by the hydraulic jack, and then a displacement of the pile is obtained from a moving distance of a jacking member displayed by the hydraulic jack in real time, so as to obtain a load versus displacement curve graph; and
in the step 8, the pulling out the pile is completed by vibration in conjunction with an increase of a weight in a weight plate.

* * * * *